(12) United States Patent
Zeng et al.

(10) Patent No.: US 8,229,663 B2
(45) Date of Patent: Jul. 24, 2012

(54) COMBINED VEHICLE-TO-VEHICLE COMMUNICATION AND OBJECT DETECTION SENSING

(75) Inventors: Shuqing Zeng, Sterling Heights, MI (US); Hariharan Krishnan, Troy, MI (US); Varsha Sadekar, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 462 days.

(21) Appl. No.: 12/364,585

(22) Filed: Feb. 3, 2009

(65) Prior Publication Data

US 2010/0198513 A1 Aug. 5, 2010

(51) Int. Cl.
*G06F 17/10* (2006.01)
*G06G 7/78* (2006.01)
*G08G 1/16* (2006.01)

(52) U.S. Cl. .......... 701/301; 701/28; 701/469; 701/495; 701/511; 701/519; 701/523; 701/534; 701/300; 340/905; 340/937; 340/939; 340/995.24; 340/995.25; 340/995.28; 340/436; 180/168; 180/169; 342/70; 342/72

(58) Field of Classification Search .............. 701/23–28, 701/36–49, 116–119, 200–302, 400, 408, 701/409, 414, 422, 423, 428, 439, 445, 446, 701/448, 469, 472, 495, 511, 519, 523, 534; 340/901–905, 933–943, 995.1–996, 435, 340/436, 341, 686.6, 932.2, 988–993; 180/167–170; 398/118; 342/70–72

See application file for complete search history.

(56) References Cited

U.S. PATENT DOCUMENTS

| | | | |
|---|---|---|---|
| 5,428,544 A * | 6/1995 | Shyu | 701/117 |
| 6,615,137 B2 * | 9/2003 | Lutter et al. | 701/301 |
| 6,650,252 B2 * | 11/2003 | Miller, Jr. | 340/989 |
| 7,061,373 B2 * | 6/2006 | Takahashi | 340/435 |
| 7,379,813 B2 * | 5/2008 | Kubota et al. | 701/211 |
| 7,382,274 B1 * | 6/2008 | Kermani et al. | 340/901 |
| 7,746,271 B2 * | 6/2010 | Furstenberg | 342/357.23 |
| 7,904,247 B2 * | 3/2011 | Nakamori | 701/301 |
| 2005/0225477 A1 * | 10/2005 | Cong et al. | 342/70 |
| 2006/0055525 A1 * | 3/2006 | Kubota et al. | 340/461 |
| 2008/0300787 A1 * | 12/2008 | Zeng | 701/301 |
| 2010/0057361 A1 * | 3/2010 | Caveney et al. | 701/301 |

* cited by examiner

*Primary Examiner* — Hussein Elchanti
*Assistant Examiner* — Rami Khatib (57) ABSTRACT

A vehicle awareness system for monitoring remote vehicles relative to a host vehicle. The vehicle awareness system includes at least one object sensing device and a vehicle-to-vehicle communication device. A data collection module is provided for obtaining a sensor object data map and vehicle-to-vehicle object data map. A fusion module merges the sensor object data map and vehicle-to-vehicle object data map for generating a cumulative object data map. A tracking module estimates the relative position of the remote vehicles to the host vehicle.

27 Claims, 5 Drawing Sheets

COMBINED VEHICLE-TO-VEHICLE COMMUNICATION AND OBJECT DETECTION SENSING

BACKGROUND OF INVENTION

An embodiment of the invention relates generally to remote vehicle awareness monitoring.

A vehicle-to-vehicle (V2V) system relates to co-operative communications for a vehicle based on two-way communications for interacting in real time. These systems are preferably directed at traffic management, collision warning, and collision avoidance. Such systems can extend a host vehicle's range of awareness of surrounding environmental conditions by providing relevant information regarding the status of traffic in addition to any safety related events occurring in proximity to those neighboring vehicles of the host vehicle.

V2V communication systems increase the quality and reliability of information received by a host vehicle. However, the reliability of the information received from a remote vehicle is still uncertain due to inaccuracies of data provided to the host vehicle or obstructions in locations such as cities populated with tall buildings causing communication interference with GPS data or communications between vehicles. Therefore, it is desirable for a host vehicle to be able to accurately access its vehicle location and conditions with respect to surrounding vehicles.

SUMMARY OF INVENTION

An advantage of an embodiment of the invention is an awareness and position of remote vehicles relative to a host vehicle. In addition, the range of the monitored area surrounding the vehicle is enlarged as a result of fusing data from a V2V communication system and object sensing devices. Moreover, errors in a vehicle's sensing devices may be corrected or compensated for as a result of the fused data from the V2V communication system and object sensing devices.

An embodiment contemplates a method of enhancing a host vehicle awareness system relative to remote vehicles. The host vehicle includes at least one object sensing device for sensing objects remote from the host vehicle. The host vehicle further includes a vehicle-to-vehicle communication system for exchanging vehicle data in vehicle-to-vehicle messages between remote vehicles and the host vehicle. A sensor object data map is generated in response to the sensed objects. A vehicle-to-vehicle object data map is generated in response to a vehicle-to-vehicle message. The vehicle-to-vehicle object data map and the sensor object data map are merged to collectively determine relative positions of remote vehicles to the host vehicle. The relative position of the remote vehicles to the host vehicle is estimated utilizing the merged data maps. The tracking data is output to safety related applications for identifying threat assessments to the host vehicle An embodiment contemplates a vehicle awareness system for monitoring remote vehicles relative to a host vehicle. The vehicle awareness system includes at least one object sensing device and a vehicle-to-vehicle communication device. A data collection module is provided for obtaining a sensor object data map and vehicle-to-vehicle object data map. A fusion module merges the sensor object data map and vehicle-to-vehicle object data map for generating a cumulative object data map. A tracking module estimates the relative position of the remote vehicles to the host vehicle.

DETAILED DESCRIPTION

Figure 1:
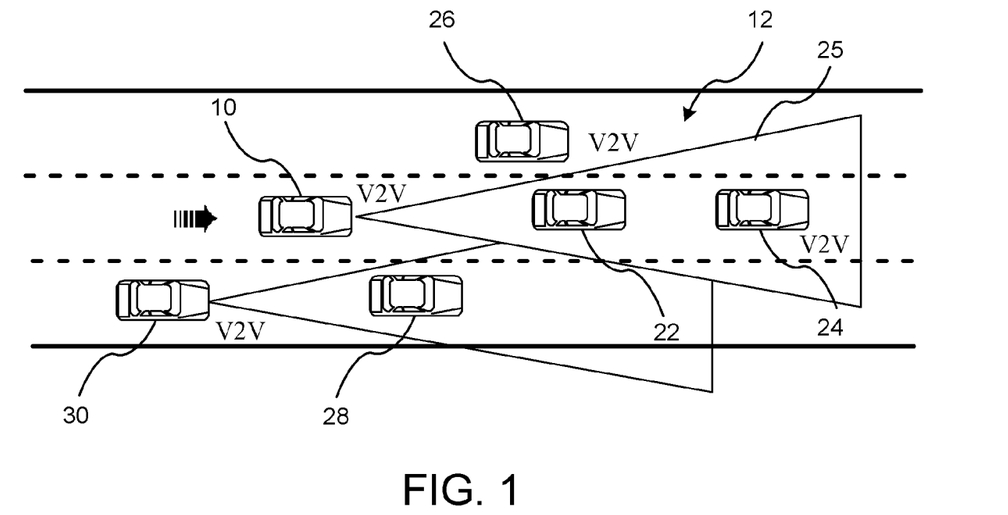
FIG. 1 is an example of a traffic flow diagram.

There is shown generally in FIG. 1 a traffic flow diagram illustrating a host vehicle 10 and a plurality of remote vehicles 12. The remote vehicles 12 include a plurality of mobile vehicles where some of the vehicles have communication capabilities with the host vehicle 10 known as vehicle-to-vehicle (V2V) messaging. The host vehicle 10 and those respective remote vehicles 12 that have communication capabilities periodically broadcast wireless messages to one another over a respective inter-vehicle communication network, such as, but not limited to, a dedicated short range communication protocol (DSRC) as known in the art.

Vehicle-to-vehicle (V2V) wireless messages communicated between the vehicles may be transmitted as a standard periodic beacon message. The wireless message includes data regarding environmental awareness conditions relating to vehicle positions, vehicle kinematics/dynamic parameters, traffic or road events sensed by each respective vehicle. These environmental awareness conditions are communicated between vehicles to forewarn other drivers of vehicles of some type of safety condition, traffic delays, accident, or other current conditions of potential importance to a driver. One of the objectives is to provide advance warning to neighboring vehicles of a condition so as to provide additional time to react to the condition. Such warnings for environmental awareness conditions may include, but are not limited to, traffic congestion, accidents, forward collision warnings (FCW) in effect in the transmitting vehicle, lateral collision warning (LCW), lane departure warning (LDW), slow/stopped vehicles ahead, emergency electronic brake light activation (EEBL), rear end central high mounted stop light (CHMSL) activation, intersection collision warning/avoidance, straight crossing path, working zone warning, blind spot/lane change, and visibility enhancement of pedestrians/cyclists. In addition, line of sight object tracking, non-line of sight tracking, and path prediction may be determined through V2V communications. Potential redundancy in receiving information from more than one vehicle source improves tracking accuracy and reliability thereby reducing false detections. Health status information (which relates to the reliability and accuracy of the information obtained by the vehicle devices, software and hardware modules, and other vehicle subsystems) may also be communicated.

Figure 2:
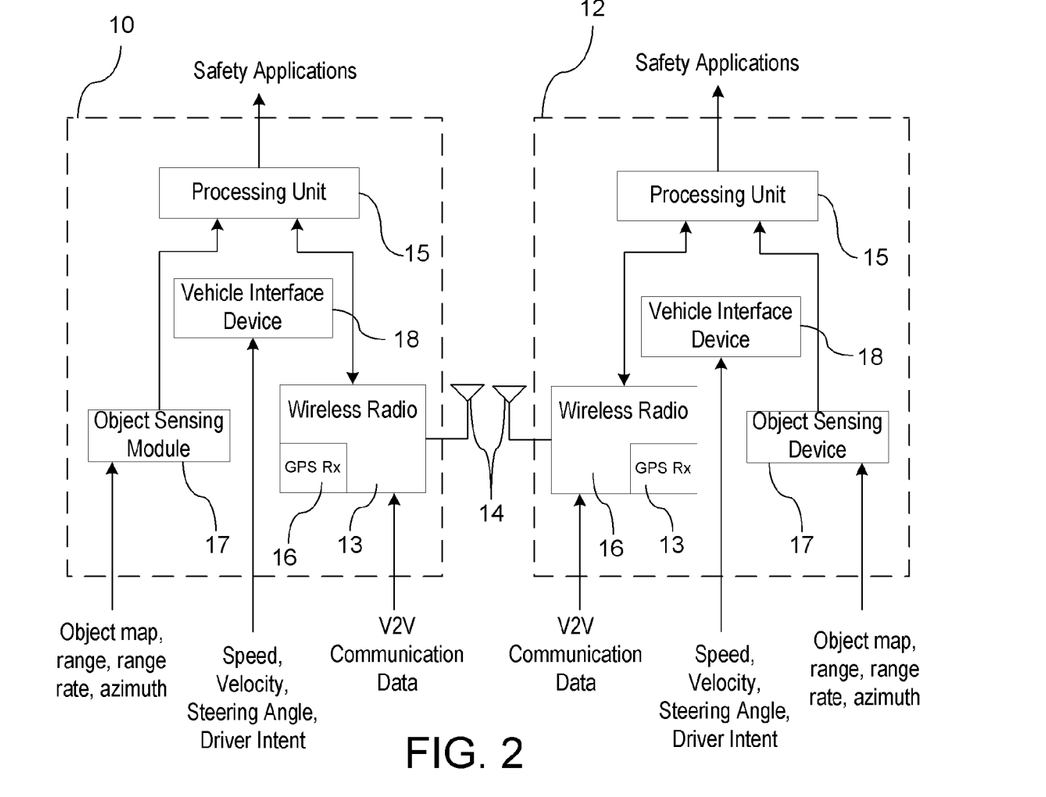
FIG. 2 is a block diagram of the system architecture for a data fusion system.

FIG. 2 illustrates the system architecture for the host vehicle 10 and a respective remote vehicle 12. The host vehicle 10 and the respective remote vehicle 12 (e.g., remote vehicles) are each equipped with a wireless radio 13 that includes a transmitter and a receiver (or transceiver) for broadcasting and receiving the wireless messages via an antenna 14. The host vehicle 10 and respective remote vehicle 12 further include respective processing units 15 for processing the data received in the wireless message or other transmitting devices such as a global positioning system (GPS) receiver 16. Alternatively, the wireless radio may also function as a GPS receiver. Each vehicle also includes an object detection module 17 for collecting data received form object detection sensors. The system may further include a vehicle interface device 18 for collecting information including, but not limited to, speed, braking, yaw rate, acceleration, and steering wheel angle.

A GPS utilizes a constellation of satellites that transmit signals which enable the GPS receiver 18 of a vehicle to determine its location, speed, direction, and time. GPS data for a respective vehicle of the V2V communication network is broadcast as part of the wireless message for identifying the location of the transmitting vehicle. This allows the respective processing unit 15 of the host vehicle 10 to evaluate the message contents in light of the remote vehicle's position for assessing the relevance of a respective condition to the host vehicle 10.

The object detection module 17 receives data from the object detection devices that include, but are not limited to, radar-based detection devices, vision-based detection devices, and light-based detection devices. Examples of such devices may include radar detectors (e.g., long range and short range radars), cameras, and Lidar devices, stereo vision. Each respective sensing system detects or captures an image in the respective sensors field-of-view. The field-of-view is dependent upon the direction in which the object detection sensors are directed. Some of the data obtained through V2V communications may not be obtainable by the object detection devices, and vice versa. By combining the data obtained from both systems, a comprehensive awareness of the vehicle surroundings may be obtained in addition to correcting errors that commonly occur with each sensing system.

Referring again to FIG. 1, the host vehicle 10 is equipped with V2V communication system and object detection sensing devices. The benefit of having object detection sensors and/or V2V communication is discussed herein. Remote vehicle vehicles 22 and 24 are detected by the object detection sensors of the host vehicle 10 as shown. A field-of-view for a sensed area forward of the host vehicle is illustrated generally by 25. Remote vehicle 24 is equipped with a V2V communication device and is in communication with host vehicle 10. Remote vehicle 24 may also be in communication with vehicles forward of remote vehicle 24 that are out of the broadcasting range of the host vehicle 10. The V2V messaging information obtained by remote vehicle 24 is transmitted to host vehicle 10 which provides more detailed information of what is occurring beyond that which could be obtained solely by the host vehicle's object detection sensing devices. Also contained within the data communication from remote vehicle 24 is the remote vehicle's GPS position. The received information from the remote vehicle 24, in cooperation with the data sensed by the host vehicle 10, allows the host vehicle 10 to determine whether errors may be present in either the host vehicle's GPS data or received GPS data from the remote vehicle 24. If errors are present, such errors can be compensated for or corrected.

Shown in FIG. 1 is a remote vehicle 26, which is located out of the field-of-view of host vehicle detection sensors. Although the remote vehicle 26 is not detectable by the host vehicle object detection sensors due to remote vehicles position, the remote vehicle 26 includes a V2V communication system which is able to communicate its GPS position to host vehicle 10.

Also shown in FIG. 1 is remote vehicle 28. Remote vehicle 28 is not equipped with a V2V communication system or object detection sensing devices, and therefore, cannot provide any information including its location relative to the host vehicle 10, and therefore, a location of the remote vehicle 28 will be unknown to the host vehicle 10. However, remote vehicle 30 includes both V2V communication and object detection sensing devices. Remote vehicle 30 detects remote vehicle 28 using its object detection sensors and transmits an estimated position of remote vehicle 30 as well as its own GPS position to host vehicle 10 via the V2V communication system. As a result, fusing the V2V communication data and objects detected by the host vehicle 10 may construct a 360 degree vehicle object map surrounding the host vehicle 10.

Figure 3:
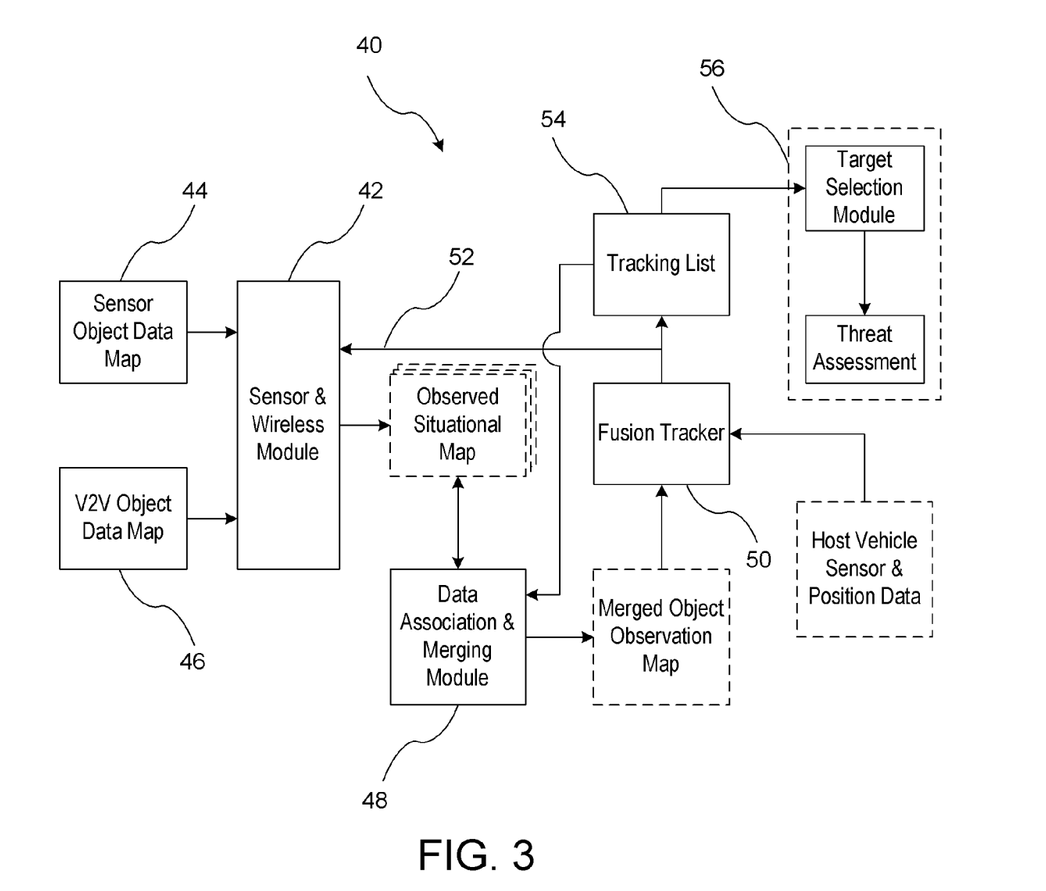
FIG. 3 is a block flow diagram of the data fusion system

FIG. 3 illustrates a block flow diagram of a cooperative communication and object sensing system shown generally at 40. A sensor and wireless module 42 receives inputs from a sensor object data map 44 and a V2V object data map 46. The sensor object data map 44 is constructed with inputs provided from object detection sensors. Objects detected by the object detection sensors may include, but are not limited to, remote vehicles, buildings, guard rails, and other objects in the object detection device's field of view. The V2V object data map 46 is constructed using data communicated from other vehicles including GPS data. The sensor and wireless module 42 constructs an observed situational map in response to the data determined from the sensor object data map 44 and the V2V object data map 46. Each respective observed situational map includes, but is not limited to, range, range rate, and azimuth of respective targets. As a result, more than one observed situational map for a respective target may be generated based on the data from the various sources. Prioritization may be given to the V2V object data map or the sensor object data map based on the current location of the vehicle if errors are determined between the two data maps. For example, if the host vehicle is traveling in an urban-like location having tall buildings which is causing GPS obstructions, then prioritization is given to the sensor object data map. Conversely, if the a vehicle is traveling in a rural setting where errors may be present in the sensor object data map, then prioritization may be given to the V2V object data map since communication between vehicles and GPS data are free from obstructions.

Each of the respective observed situational maps are provided to a data association and merging module 48 where the data is fused into a merged object observation map That is, the plurality of data collected from the various sources are fused into a single collective map which provides a determined range, range rate, and azimuth for a respective vehicle. Data for each vehicle detected is fused into the merged object observation map. The merged object observation map provides a comprehensive map containing all detected vehicles.

The merged object observation map is provided to a filter tracker 50 such as, but not limited to, a Kalman filter tracker. In addition, the host vehicle's GPS position, vehicle dynamic information (e.g., velocity, speed, yaw rate), and driver intent information (e.g., turn signal, steering pattern) is provided to the filter tracker. The filter tracker 50 constantly updates the tracking of the target vehicles relative to the position, speed, and orientation of the host vehicle for determining a predictive path of travel. This allows host vehicle to monitor the surrounding vehicles of the host vehicle for determining a perceptual awareness of the remote vehicles. Tracking feedback data 52 from the filter tracker 50 may be provided to the sensor and wireless module 42 for improving an accuracy of data obtained from the sensing device. The fusing and tracking routine will be further discussed in detail later.

A 360 degree object tracking list 54 is generated by the filter tracker 50 that includes the host vehicle's position, speed, orientation, and each remote vehicle's position, speed, and orientation for host vehicle safety awareness evaluation. Moreover, the tracking list may be provided as feedback to the data association and merging module 48 to continuously determine the relative position of surrounding vehicles to the host vehicle 10.

The tracking list 54 is then provided to various safety applications 56 (e.g., target selection modules) of the vehicle for assessing whether a safety notification should be actuated. For example, a forward collision warning (FCW) module assesses the threat of collisions forward of the vehicle. An FCW alert is issued when a vehicle is in a path of travel en route to a collision. If the target vehicle is not in the lane of travel or is traveling in a different orientation, then the FCW module will not react to this target in its assessment. If a respective safety application module identifies a potential threat, the threat will be assessed and the warning may be actuated for identifying the potential safety issue. Each target selection module receives the tracking list 54 and determines its own threat assessment for issuing a warning notification or actuating a safety countermeasure in response to the threat assessment.

Figure 4:
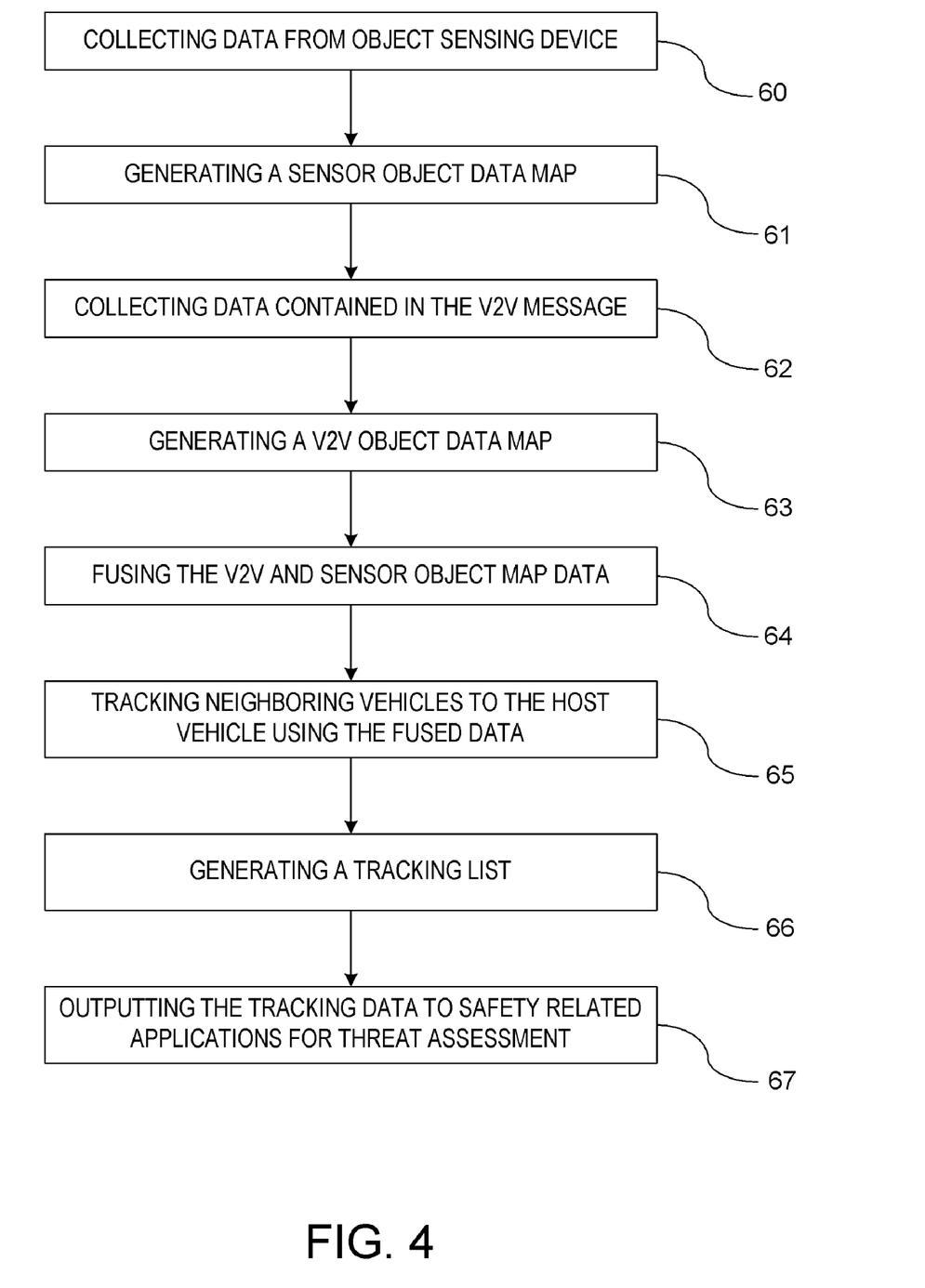
FIG. 4 is a flowchart of a method for fusing object map data and V2V data.

FIG. 4 is a flowchart of a method for fusing object sensed map data and V2V map data. In step 60, data is collected from at least one object sensing device. The object sensing device typically monitors a respective area remote of the vehicle detectable objects. In step 61, a sensor object data map is generated in response to the sensed objects.

In step 62, data is collected from a V2V communication message. The data collected from the V2V message may include a remote vehicle's GPS information, object sensor information from another remote vehicle, vehicle dynamic information from the remote vehicle, alert warnings received by the remote vehicle, and limited driver intent information of the remote vehicle. In step 63, a V2V object data map is generated in response to data contained in the V2V communication message. In step 64, the object data map and the V2V data map are fused for generating a merged object observation map.

In step 65, the fused data is supplied to a filter tracker, such as a Kalman filter tracker, for tracking the remote vehicles surrounding the host vehicle. The Kalman filter is a recursive estimator. Kalman filtering requires that only an estimated state from the previous time step and current measurement are needed to determine an estimate of the current state. The tracking filter tracks the path of the remote vehicles relative to the position of the host vehicle and can generate a predictive path based on the received data in the event communication is lost with the object detections devices or V2V communications.

In step 66, a tracking list is generated. The tracking list identifies the positions of the remote vehicles surrounding the host vehicle. In addition, the vehicle speed, yaw rate, and orientation are listed for each of the remote vehicles.

In step 67, the tracking data is output to a safety application for threat assessment. The tracking data is supplied to various safety systems where the information is processed and threat assessments are made with respect to each remote vehicle and the impact it may have on the host vehicle for a respective safety application.

Embodiments of the fusing and tracking routine mentioned earlier will be described herein. It should be noted that the routines described herein are one of a plurality of routines that may be used for the fusing and tracking and it is understood that the invention is not limited to the routines described herein. To perform fusion and tracking, first we let $X_1, X_2, \ldots, X_k$ be the K vehicles in the communication region. Let $X_i$ be the state of the i-th vehicle, including the north displacement, east displacement, heading (angle with respect to the north), angular velocity, and velocity referring to the base reference. Let $X_H$ be the state of the host vehicle and $g_i$ be the GPS measurements of $X_i$, including north displacement, east displacement, heading, and velocity, respectively. $m_i$ is the vector of the i-th vehicle's wheel speed and yaw rate measurements and $o_i^j$ be the measurements (i.e., range, range rate, and azimuth angle) of the j-th vehicle measured by the sensing device on the i-th vehicle. The goal is to recover the state of the vehicles $\{X_i | i=1, \ldots, K\}$ from the measurements $\{g_m, m_i | i=1, \ldots, K\}$ and to $\{o^j | i=1, \ldots, K, j=1, \ldots, L_i\}$ with $L_i$ being the number of targets returned by the sensing devices in the i-th vehicle.

In the following derivation, the Gaussian distribution is denoted by information array. For example, random variable $x \sim N(\mu, Q)$ can be represented as $x \sim [R, z]$ where $Q = R^{-T}R^{-1}$ and $z = R\mu$. We note that each vehicle has its own system dynamics equation as:

$$X_i(t+1) = f_i(X_i, w_i) \qquad (1)$$

where term $w_i \sim [R_{wi}, z_{wi}]$ is a random variable represented the process noise. The linear approximation of (1) in the neighborhood of $[X^*_i, w^*_i]$ can be expressed as:

$$X_i(t+1) = \Phi_i X_i + G_i w_i + u_{i2} \qquad (2)$$

where $\Phi_i$ and $G_i$ are Jacobian matrices of function $f$ in Eq. (1) with respect to variable $X_i$ and $w_i$, respectively; and the nonlinear term is represented by:

$$u_{i2} = f_i(X^*_i, w^*_i) - \Phi_i X^*_i - G_i w^*_i. \qquad (3)$$

Measurements taken by the GPS receiver, the in-vehicle sensors, and the object detection sensors are represented by the following equations. The measurement equation for the GPS receiver can be written as:

$$g_H = C_H^g X_H + v_H^g \qquad (4)$$

where the noise vector $v_H^g \sim [R_H^g, 0]$ is a zero-mean random variable. The measurement equations for wheel speed and yaw rate sensors can be written as $$m_H = C_H^m X_H + v_H^m \qquad (5)$$

where the noise vector $v_H^m$ is zero-mean random variable, denoted by $v_H^m \sim [R_H^m, 0]$. Each vehicle maintains an estimate of the state of the vehicles $\{X_i | i=1, \ldots, K\}$. At a time instant t, the object sensing device measures a list of objects $\{o_H^{k_l} | i=1, \ldots, L_H\}$, where $\kappa_l$ is the data association variable that determines that the l-th object is from the $\kappa_l$-th vehicle $X_{\kappa_l}$; and $L_H$ is the number of objects measured by the sensing device. Therefore, the equation for the l-th object from the sensor can be written as $$o_H^{\kappa_l} = h(X_{\kappa_l}, X_H) + v_H^{\kappa_l} \qquad (6)$$

where the noise term $V_H^{\kappa_l} \sim [R_H^{\kappa_l}, 0]$ whose covariance matrix represents the accuracy level of the object sensing device. The linear approximation of (6) in the neighborhood $[X^*_{\kappa_l}, X^*_H]$ can be expressed as:

$$O_H^{\kappa_l} = [C_{\kappa_l}^H \ C_H^{\kappa_l}] \begin{bmatrix} X_{\kappa_l} \\ X_H \end{bmatrix} + u_{1\kappa_l} + v_H^{\kappa_l} \qquad (7)$$

where $C_{\kappa_l}^H$ is the Jacobian matrix with respect to $X_{\kappa_l}$, $C_H^{\kappa_l}$ is the Jacobian matrix with respect to $X_H$, and the nonlinear bias term:

$$u_{1\kappa_l} = h(X^*_{\kappa_l}, X^*_H) - C_{\kappa_l}^H X^*_{\kappa_l} - C_H^{\kappa_l} X^*_H. \qquad (8)$$

In each time instant t, the wireless radio module in host vehicle receives broadcasting packets from remote vehicles within the communication range. The i-th packet contains the estimate of the i-th vehicle's state $x_i$, which can be regarded as a measurement $$x_i = X_i + v_i \quad (9)$$

where the noise term $v_i \sim [R_i, 0]$ represents the uncertainty the state estimate.

A first embodiment of the fusing and tracking routine mentioned earlier is as follows. It is assumed that the states of the host vehicle $X_H$ and the remote vehicles $\{X_i | i=1, \ldots, K\}$ are mutually uncorrelated. Therefore, extended Kalman filters can be used to estimate the state variables separately. Localization of the host vehicle $X_H$ is represented by fusion of the GPS and in-vehicle sensors. The following equations may written:

$$\begin{bmatrix} g_H \\ m_H \end{bmatrix} = \begin{bmatrix} C_H^g \\ C_H^m \end{bmatrix} X_H + \begin{bmatrix} v_H^g \\ v_H^m \end{bmatrix} \quad (10)$$

Tracking of the remote vehicles is represented by fusion of the V2V sensor and object sensing devices. An assumption is made that the object sensing device measures a list of objects $\{o_H^{K_k} | K_k = i\}$ corresponding to the i-th vehicle at time instant t. The measurement equation can be represent as:

$$\begin{bmatrix} x_i \\ o_H^{\kappa_1} \\ \vdots \\ o_H^{\kappa_k} \end{bmatrix} = \begin{bmatrix} I_5 \\ C_H^{\kappa_1} \\ \vdots \\ C_H^{\kappa_k} \end{bmatrix} X_i + \begin{bmatrix} 0 \\ u_{1\kappa_1} + C_H^{\kappa_1} X_H \\ \vdots \\ u_{1\kappa_k} + C_H^{\kappa_k} X_H \end{bmatrix} + \begin{bmatrix} v_i \\ v_H^{\kappa_1} \\ \vdots \\ v_H^{\kappa_k} \end{bmatrix} \quad (11)$$

Figure 5:
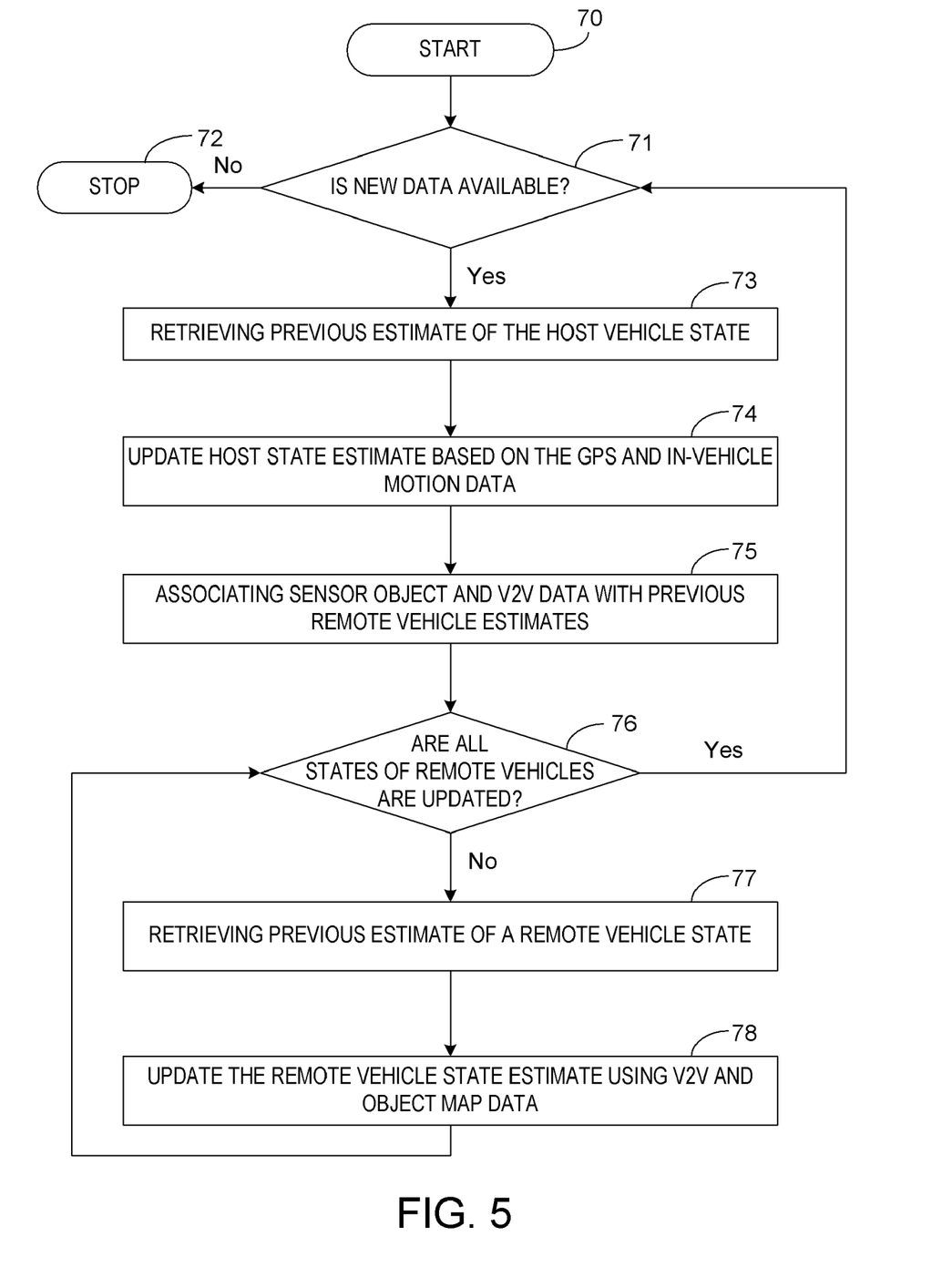
FIG. 5 is a flowchart of a method for decoupling localization and tracking.

Key steps in the decoupling routine as represented above are described below in accordance with FIG. 5. In step 70, the routine is initiated. In step 71, given the previous estimates of the states of the host vehicle and remote vehicles at time t−1, a determination is made whether new data is arrived at time t. Such data may be updated from the system dynamic equations (2) and measurement equations (10) and (11).

In step 71, if new data is not arrived, then the routine is stopped in step 72. If new updated data has arrived, then the previous estimate of the states of the host vehicle $\hat{X}_H(t-1)$ and the covariance matrix $\hat{P}_H(t-1)$) are retrieved in step 73.

In step 74, host vehicle state estimates are updated based on the GPS and the in vehicle motion data. An extended Kalman filter, or similar filter, is applied to derive the estimate of the state of host vehicle at time t based on system dynamics equations (2) and measurement equations (10). The updated estimate $\hat{X}_H$ and the covariance matrix $\hat{P}_H$ is output.

In step 75, the association variable $\kappa_l$ for the l-th sensor object $o_H^l$ for $l=1, \ldots, L_H$ is computed. This associates the sensor object and V2V data with previous remote vehicle estimates.

In step 76, a determination is made whether all the states of the remote vehicles are updated. If the all the states have been updated a return is made to step 71 to determine if new data has arrived. If all the states have not been updated, then the previous estimate of the state of the i-th remote vehicle $\hat{X}_i(t-1)$ and the covariance matrix $\hat{P}_i(t-1)$ is retrieved in step 77.

In step 78, the remote vehicle state estimates are updated based on the V2V and object map data. An extended Kalman filter, or similar filter, is used to derive the estimate of the state of the i-th remote vehicle at time t based on system dynamics and measurement equations (10) and (2), respectively. The updated estimate $\hat{X}_i$ and the covariance matrix $\hat{P}_i$ are output. A return is then made to step 76 to determine if all the states have been updated. If all the steps have not been updated, then steps 77 through 78 are repeated until all the states are updated. Otherwise a return is made to step 71 to check for the arrival of new data.

Figure 6:
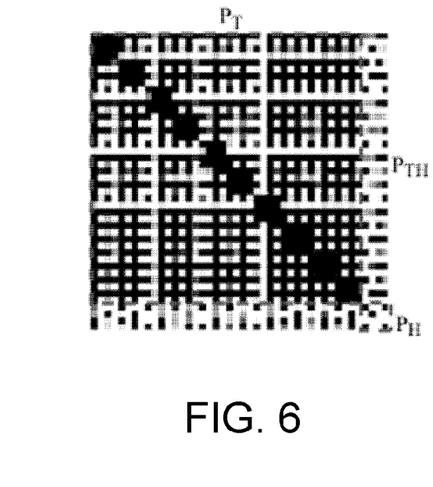
FIG. 6 is a graph of correlation matrices for joint remote vehicles and host vehicle localization.
Figure 7:
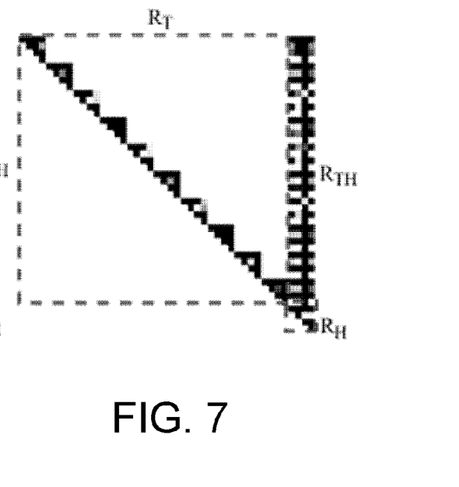
FIG. 7 is a graph of matrices for normalized Cholesky factor of inverse covariance.

FIGS. 6 and 7 illustrate the results of a joint localization and tracking for ten vehicles. The normalized covariance of the joint state is visualized in FIG. 6. Darkened entries indicate strong correlations. It is clear that not only the tracks $X_T$ and the host vehicle $X_H$ are correlated but also each pair of tracks in $X_T$ is mutually correlated. The checkerboard appearance of the joint covariance matrix confirms the above statement. Therefore, the decoupled approximation that ignores the off-diagonal correlated entries is not asymptotical optimal.

FIG. 7 illustrates a Cholesky factor of the inverse covariance matrix (also known as information matrix) normalized like the correlation matrix for verifying the results of the approach shown in FIG. 6. Entries in this matrix can be regarded as constraints, or connections, between the states of the remote vehicles and the host vehicle. The darker an entry as shown in FIG. 7, then the stronger the connection between the states. As FIG. 7 suggests, the Cholesky factor R not only appears sparse but also is nicely structured. The matrix is only dominated by the entries within the state of a remote vehicle, or the entries between a remote vehicle and the host vehicle state.

A second embodiment of the fusing and tracking routine mentioned earlier will be described herein. The second embodiment exploits and maintains this structure throughout the calculation. In addition, storing a sparse factor matrix requires linear space. More importantly, updates can be performed in linear time with regard to the numbers of track in the system.

By combining the above derived measurement equations (4), (5), (7) and (9), we obtain:

$$\begin{bmatrix} x_1 \\ \vdots \\ x_K \\ o_H^{\kappa_1} \\ \vdots \\ o_H^{\kappa_{L_H}} \\ g_H \\ m_H \end{bmatrix} = \begin{bmatrix} I_5 & \cdots & 0 & 0 \\ \vdots & \ddots & \vdots & \vdots \\ 0 & \cdots & I_5 & 0 \\ C_H^{\kappa_1} & \cdots & 0 & C_{\kappa_1}^H \\ \vdots & \ddots & \vdots & \vdots \\ 0 & \cdots & C_H^{\kappa_{L_H}} & C_{\kappa_{L_H}}^H \\ 0 & 0 & 0 & C_H^g \\ 0 & 0 & 0 & C_H^m \end{bmatrix} \begin{bmatrix} X_1 \\ \vdots \\ X_K \\ X_H \end{bmatrix} + \begin{bmatrix} 0 \\ \vdots \\ 0 \\ u_{1\kappa_1} \\ \vdots \\ u_{1\kappa_{L_H}} \\ 0 \\ 0 \end{bmatrix} + \begin{bmatrix} v_1 \\ \vdots \\ v_K \\ v_H^{\kappa_1} \\ \vdots \\ v_H^{\kappa_{L_H}} \\ v_H^g \\ v_H^m \end{bmatrix} \quad (12)$$

or represented differently $$o = [C_T \; C_H] \begin{bmatrix} X_T \\ X_H \end{bmatrix} + u_1 + v \quad (13)$$

where $X_T = [X_1^T, \ldots, X_K^T]^T$ and $X_H$ represent the remote vehicle tracks and localization of the host vehicle, respectively. Without loss of generality, it is assumed that v is a zero-mean random variable with identity covariance matrix, i.e., $v \sim [1,0]$. By combining the system dynamic equations for each vehicle in Eq. (1), the follow results is derived $$X(t+1) = \Phi X + Gw + u_2 \quad (14)$$

where $$X = [X_1^T \ldots X_K^T X_H^T]^T \quad (15)$$

$$G = \text{diag}[G_1 \ldots G_K G_H] \quad (16)$$

$$w = [w_1^T \ldots w_K^T w_H^T]^T \quad (17)$$

$$u_2 = [u_{2,1}^T \ldots u_{2,K}^T u_{2,H}^T]^T \quad (18)$$

$$w \sim [R_w, z_w]. \quad (19)$$

As a result, the cost function is defined as:

$$J_t(X_T(t), X_H(t)) = \|\tilde{R}(0)X(0) - \tilde{z}(0)\|^2 + \sum_{t=1}^{t} \left\| o(\tau) - [C_T(\tau) C_H(\tau)] \begin{bmatrix} X_T(\tau) \\ X_H(\tau) \end{bmatrix} + u_1(\tau) \right\|^2 + \sum_{t=1}^{t} \|R_w(\tau) - z_w(\tau)\|^2 \quad (20)$$

where $X(0) \sim (\tilde{R}(0), \tilde{z}(0))$ represents the initial prior knowledge about the states of the vehicles. The goal is to find those factors $X_T(t)$ and $X_H(t)$ that minimize the cost function $J_t$ subject to the system dynamics constraint (14).

Figure 8:
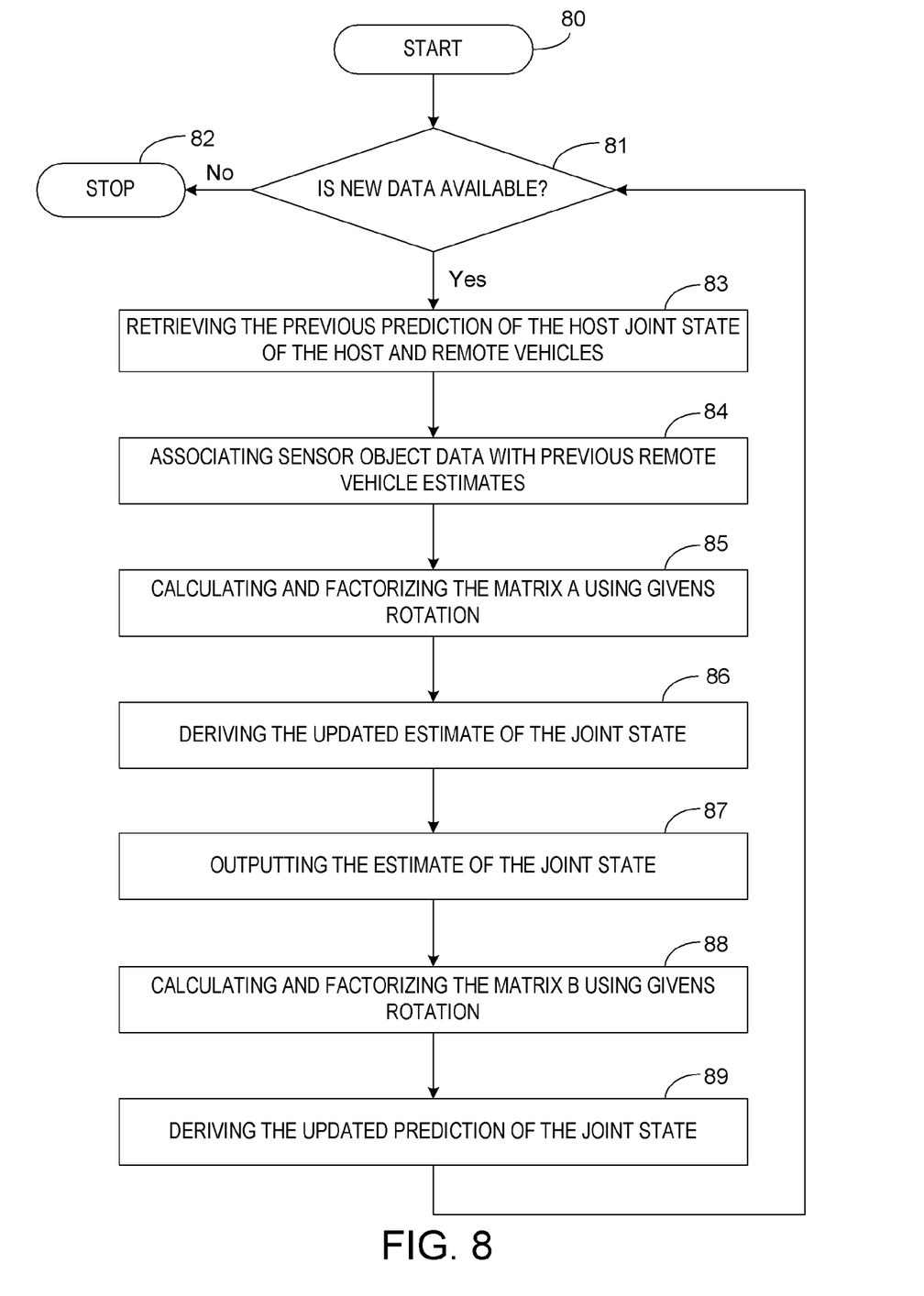
FIG. 8 is a flowchart of a method for joint localization and tracking.

FIG. 8 illustrates a method for the joint localization and tracking routine. In step 80, the routine is initiated. In step 81, given a prediction or prior knowledge of a joint state X for time instant t, a determination is made whether new data is arrived at time t. Such data may be updated from the system dynamic equations (14) and measurement equations (12).

In step 81, if new data is not arrived, then the routine is stopped in step 82. If new updated data has arrived, then the previous prediction of the states of the joint state X at time t, (expressed by $\hat{X}$) are retrieved in step 83. The joint state X is represented as follows:

$$X \sim [\tilde{R}, \tilde{z}] = \begin{bmatrix} \tilde{R}_T & \tilde{R}_{TH} & \tilde{z}_T \\ 0 & \tilde{R}_H & \tilde{z}_H \end{bmatrix} \quad (21)$$

In step 84, the association variable $\kappa_l$ is computed for the l-th sensor object $o_H^l$, for $l=1,\ldots,L_H$.

In step 85, the coefficients $C_T$, $C_H$, and $u_1$ in the joint measurement equation of (13) is determined. The previous prediction $[\tilde{R}, \tilde{z}]$; the joint measurement matrices $C_T$ and $C_H$; and the vectors $u_1$ and o are inserted into matrix A:

$$A = \begin{bmatrix} \tilde{R}_T & \tilde{R}_{TH} & \tilde{z}_T \\ 0 & \tilde{R}_H & \tilde{z}_H \\ C_T & C_H & o - u_1 \end{bmatrix} \quad (22)$$

Matrix A is factorized using Givens rotation (output an upper triangular matrix $A' = \hat{T}A$ such that $A'^T A' = A^T A$ while $\hat{T}$ is an orthogonal matrix).

$$\hat{T}A = \begin{bmatrix} \hat{R}_T & \hat{R}_{TH} & \hat{z}_T \\ 0 & \hat{R}_H & \hat{z}_H \\ 0 & 0 & \grave{o} \end{bmatrix} \quad (23)$$

where $\grave{o}$ is the residual that reflects the discrepancy between the model and measurement.

In step 86, an updated information array $[\hat{R}, \hat{z}]$ is derived after fusion with the measurement at time t:

$$[\hat{R}, \hat{z}] = \begin{bmatrix} \hat{R}_T & \hat{R}_{TH} & \hat{z}_T \\ 0 & \hat{R}_H & \hat{z}_H \end{bmatrix} \quad (24)$$

The update estimate of the joint state (i.e., localization $\hat{X}_H$ and tracking $\hat{X}_T$) is determined by solving the following linear equation:

$$\begin{bmatrix} \hat{R}_T & \hat{R}_{TH} \\ 0 & \hat{R}_T \end{bmatrix} \begin{bmatrix} \hat{X}_T \\ \hat{X}_H \end{bmatrix} = \begin{bmatrix} \hat{z}_T \\ \hat{z}_H \end{bmatrix} \quad (25)$$

In step 87, the updated estimate of the joint state $\hat{X} = [\hat{X}_H, \hat{X}_T]$ at time t is output.

In step 88, $\Phi$, G, and $u_2$ as illustrated in equation (14) is calculated. The updated information array $[\hat{R}, \hat{z}]$, $R_w$, $\Phi$, and G is inserted into Matrix B:

$$B = \begin{bmatrix} R_w & 0 & z_w \\ -\hat{R}\Phi^{-1}G & \hat{R}\Phi^{-1} & \hat{z} + \hat{R}\Phi^{-1}u_2 \end{bmatrix} \quad (26)$$

Matrix B is factorized using Givens rotation (output an upper triangular matrix $B' = \tilde{T}B$ such that $B'^T B' = B^T B$ where $\tilde{T}$ is an orthogonal transformation) represented as:

$$\tilde{T}B = \begin{bmatrix} \tilde{R}_w(t+1) & \tilde{R}_{wX}(t+1) & \tilde{z}_w(t+1) \\ 0 & \tilde{R}(t+1) & \tilde{z}(t+1) \end{bmatrix} \quad (27)$$

In step 89, the updated prediction of the joint state $X(t+1)$ is updated in information array form $X(t+1) \sim [\tilde{R}(t+1), \tilde{z}(t+1)]$ for time t+1 (e.g., (27)) which can be utilized when the new measurements are available. A return is made step 72 to determine if new data is available.

While certain embodiments of the present invention have been described in detail, those familiar with the art to which this invention relates will recognize various alternative designs and embodiments for practicing the invention as defined by the following claims.

What is claimed is:

1. A method of enhancing a host vehicle awareness system relative to remote vehicles, the host vehicle including at least one object sensing device for sensing objects remote from the host vehicle, the host vehicle further including a vehicle-to-vehicle communication system for exchanging vehicle data in vehicle-to-vehicle messages between remote vehicles and the host vehicle, the method comprising the steps of:
generating a sensor object data map in response to the sensed objects;
generating a vehicle-to-vehicle object data map in response to a vehicle-to-vehicle message;
merging data from the vehicle-to-vehicle object data map and data from the sensor object data map in a data association and merging module to collectively determine relative positions of remote vehicles to the host vehicle, wherein merging data from the vehicle-to-vehicle object data map and data from the sensor object data map includes integrally fusing the respective data into a merged object observation map, wherein integrally fusing the respective data includes detecting a mismatch in the determined relative position between the data from the vehicle-to-vehicle object data map and the sensor object data map for a respective remote vehicle, the mismatch being identified by an associated sensor error in a covariance noise matrix, and wherein sensor error and sensor bias as identified by the covariance noise matrix is corrected in at least one of the respective data maps for cooperatively merging data in the respective object data maps;

estimating the relative position of the remote vehicles to the host vehicle utilizing the merged data maps; and outputting tracking data to safety related applications for identifying threat assessments to the host vehicle, the safety related applications actuating a safety countermeasure in the host vehicle based on the threat assessment determined by the safety related applications.

2. The method of claim 1 wherein estimating the relative position of remote vehicles includes generating feedback data from a filter tracker that is provided to a sensor and wireless module for improving an accuracy of the at least one object sensing device, the filter tracker generating and updating a tracking list of sensed objects relative to the position, speed, and orientation of the host vehicle, the sensor and wireless module constructs an observed situational map in response to the data generated from the sensor object data map and the vehicle-to-vehicle object data map.

3. The method of claim 1 further comprising the step of generating a tracking list of the surrounding vehicles in response to estimating the relative position of remote vehicles, the tracking list includes a vehicle position, speed, and yaw rate of the remote vehicles.

4. The method of claim 3 wherein the tracking list is provided as feedback for continuously determining the relative position of remote vehicles to the host vehicle.

5. The method of claim 3 wherein the tracking list is output as part of the tracking data output to the safety related applications.

6. The method of claim 1 further comprising the step of collecting vehicle dynamic information of the host vehicle for estimating the relative positioning of the host vehicle to the remote vehicles.

7. The method of claim 1 wherein the vehicle-to-vehicle object data map is obtained from GPS and wireless communication devices.

8. The method of claim 1 wherein errors are determined between the vehicle-to-vehicle object data map and the sensor object data map, wherein prioritization is given to the vehicle-to-vehicle object data map or the sensor object data map based on a current location of the vehicle.

9. The method of claim 1 wherein prioritization is given to the sensor object data map if the host vehicle is located in an urban-like location having GPS obstructions.

10. The method of claim 1 wherein the safety related applications use positioning of the remote vehicles and remote vehicle orientation to actuate driver awareness notifications.

11. The method of claim 1 wherein the step of merging the vehicle-to-vehicle object data map and the sensor object data map includes joint localization and tracking of the remote vehicles and host vehicle.

12. The method of claim 11 wherein the localization of the host vehicle is characterized by the fusion of data from a global positioning system and data from in-vehicle object detection sensors, and is represented by:

$$\begin{bmatrix} g_H \\ m_H \end{bmatrix} = \begin{bmatrix} C_H^g \\ C_H^m \end{bmatrix} X_H + \begin{bmatrix} v_H^g \\ v_H^m \end{bmatrix}$$

where $g_H$, is the GPS measurements of the host vehicle, $[m_h]$ $m_H$ is a vector of the host vehicle wheel speed and yaw rate measurements, $X_H$ is a state of a host vehicle, $C_H^g$ is the GPS measurement matrix, $C_H^m$ is the in-vehicle sensor measurement matrix, and $v_H^g$ and $v_H^m$ are noise factors.

13. The method of claim 12 wherein the tracking of the remote vehicle is characterized by a fusion of data from a vehicle-to-vehicle sensor and data from in-vehicle object detection sensors, and is represented by:

$$\begin{bmatrix} x_i \\ o_H^{\kappa_1} \\ \vdots \\ o_H^{\kappa_k} \end{bmatrix} = \begin{bmatrix} I_5 \\ C_H^{\kappa_1} \\ \vdots \\ C_H^{\kappa_k} \end{bmatrix} X_i + \begin{bmatrix} 0 \\ u_{1\kappa_1} + C_H^{\kappa_1} X_H \\ \vdots \\ u_{1\kappa_k} + C_H^{\kappa_k} X_H \end{bmatrix} + \begin{bmatrix} v_i \\ v_H^{\kappa_1} \\ \vdots \\ v_H^{\kappa_k} \end{bmatrix}$$

where $X_i$ is the state of a i-th remote vehicle, $O_H^{\kappa_k}$ is the range, range rate, and azimuth angle measurements of the $\kappa_k$-th vehicle as measured by sensing device on the host vehicle, $I_5$ is an identity matrix, $u_{1\kappa_1}$ is a vector defined in (8), $v_i$ is a noise factor of the host vehicle, $v_H^{\kappa_k}$ is a noise factor of the host vehicle.

14. The method of claim 13 further comprising the step of generating a sparse matrix, the sparse matrix being represented by:

$$\begin{bmatrix} x_1 \\ \vdots \\ x_K \\ o_H^{\kappa_1} \\ \vdots \\ o_H^{\kappa_{L_H}} \\ g_H \\ m_H \end{bmatrix} = \begin{bmatrix} I_5 & \cdots & 0 & 0 \\ \vdots & \ddots & \vdots & \vdots \\ 0 & \cdots & I_5 & 0 \\ C_H^{\kappa_1} & \cdots & 0 & C_{\kappa_1}^H \\ \vdots & \ddots & \vdots & \vdots \\ 0 & \cdots & C_H^{\kappa_{L_H}} & C_{\kappa_{L_H}}^H \\ 0 & 0 & 0 & C_H^g \\ 0 & 0 & 0 & C_H^m \end{bmatrix} \begin{bmatrix} X_1 \\ \vdots \\ X_K \\ X_H \end{bmatrix} + \begin{bmatrix} 0 \\ \vdots \\ 0 \\ u_{1\kappa_1} \\ \vdots \\ u_{1\kappa_{L_H}} \\ 0 \\ 0 \end{bmatrix} + \begin{bmatrix} v_1 \\ \vdots \\ v_K \\ v_H^{\kappa_1} \\ \vdots \\ v_H^{\kappa_{L_H}} \\ v_H^g \\ v_H^m \end{bmatrix}.$$

15. The method of claim 13 further comprising the step of determining a system dynamic equation, the system dynamic equation being represented by $$X(t+1)=f(X, w)$$

where $X(t+1)$ is a prediction of the joint state; and w is a random variable representing un-modeled process noise.

16. The method of claim 13 wherein the linearization of the system dynamic equation is represented by:

$$X(t+1)=\Phi X+Gw+u_2$$

where $\Phi$ is the Jacobian matrix of function $f$ with respect to X, G is the Jacobian matrix of function $f$ with respect to w, and the nonlinear term $u_2$ is represented by the formula:

$$u_2=f(X^*, w^*)-\Phi X^*-Gw^*.$$

17. A vehicle awareness system for monitoring remote vehicles relative to a host vehicle, the vehicle awareness system comprising:

at least one object sensing device;
a vehicle-to-vehicle communication device;

a data collection module for obtaining a sensor object data map and vehicle-to-vehicle object data map;

a fusion module for fusing data from the sensor object data map and data from the vehicle-to-vehicle object data map for generating a merged situational object data map, wherein fusing the respective data includes detecting a mismatch in a determined relative position between the data from the vehicle-to-vehicle object data map and the data from the sensor object data map for a respective remote vehicle, the mismatch being identified by an associated sensor error in a covariance noise matrix, and wherein sensor error and bias as identified by the covariance noise matrix is corrected in at least one of the respective data maps for cooperatively merging data in the respective object data maps; and a tracking module for estimating the relative position of the remote vehicles to the host vehicle.

18. The system of claim 17 wherein the at least one object sensing device includes a radar-based sensing device.

19. The system of claim 17 wherein the at least one object sensing device includes a vision-based sensing device.

20. The system of claim 17 wherein the at least one object sensing device includes a light-based sensing device.

21. The system of claim 17 wherein the vehicle-to-vehicle communication device includes at least a GPS device and wireless communication module for communicating vehicle information between vehicles.

22. The system of claim 17 wherein the tracking device module includes a Kalman filter.

23. The system of claim 17 wherein the tracking device module includes a square root information filter.

24. The system of claim 17 wherein the tracking device module generates a tracking list that includes a vehicle position, speed, and yaw rate of the remote vehicle.

25. The system of claim 17 further comprising a feedback circuit coupled between the tracking device module and the data collection module, wherein the tracking device module generates feedback data to the data collection module via the feedback circuit for improving an accuracy of the at least one object sensing device.

26. The system of claim 17 further comprising at least one vehicle dynamic sensing device that provides vehicle dynamic data of the host vehicle for estimating the relative positioning of the host vehicle to the remote vehicles.

27. The system of claim 17 further comprising at least one safety related application for assessing a threat of remote vehicles to the host vehicle and for actuating a safety response.

* * * * *